United States Patent [19]

Grundmann

[11] 3,890,081
[45] June 17, 1975

[54] INJECTION HOLDING MACHINE CLAMP MECHANISM

[75] Inventor: Volker R. Grundmann, Glastonbury, Conn.

[73] Assignee: Litton Industrial Products, Inc., Berlin, Conn.

[22] Filed: July 30, 1973

[21] Appl. No.: 383,778

Related U.S. Application Data

[63] Continuation of Ser. No. 168,042, Aug. 1, 1971, abandoned.

[52] U.S. Cl............................. 425/450.1; 164/343
[51] Int. Cl................................................ B29f 1/00
[58] Field of Search............. 425/242, 450.1, 451.2, 425/450 C, 453; 164/137, 341, 342–343

[56] References Cited
UNITED STATES PATENTS

| | | | |
|---|---|---|---|
| 2,689,978 | 9/1954 | Roger | 425/451.2 |
| 2,916,768 | 12/1959 | Quere et al. | 425/451.2 |
| 3,418,692 | 12/1968 | Valyi | 425/451.2 |
| 3,590,436 | 7/1971 | Akesson et al. | 425/242 |
| 3,669,599 | 6/1972 | Snider et al. | 425/242 |

Primary Examiner—Robert D. Baldwin
Assistant Examiner—John McQuade
Attorney, Agent, or Firm—Arthur Gershman

[57] ABSTRACT

To provide a mechanism requiring minimum energy requirements and rapid opening and closing of an injection molding machine a clamp mechanism is provided having a base carrying an upstanding stationary platen, a movable clamp housing and a movable platen. The stationary platen, the clamp housing, and movable platen carry a plurality of elongated tie bars. A traversing cylinder having a relatively small diameter is provided to move the movable platen during the normal injection molding cycle. A plurality of pistons and cylinders is carried by the clamp housing, having each of said cylinders in fixed relationship thereto and each piston having internal threads engaging corresponding threads on one of said tie bars so that rotating all of said pistons varies the mold height of the injection molding machine and application of hydraulic pressure to all of the pistons in one direction causes clamping of the mold. A guide bar disposed between the clamp housing and the movable platen selectively prevents relative movement therebetween.

20 Claims, 7 Drawing Figures

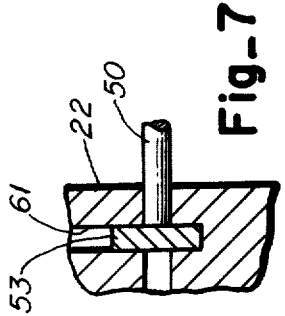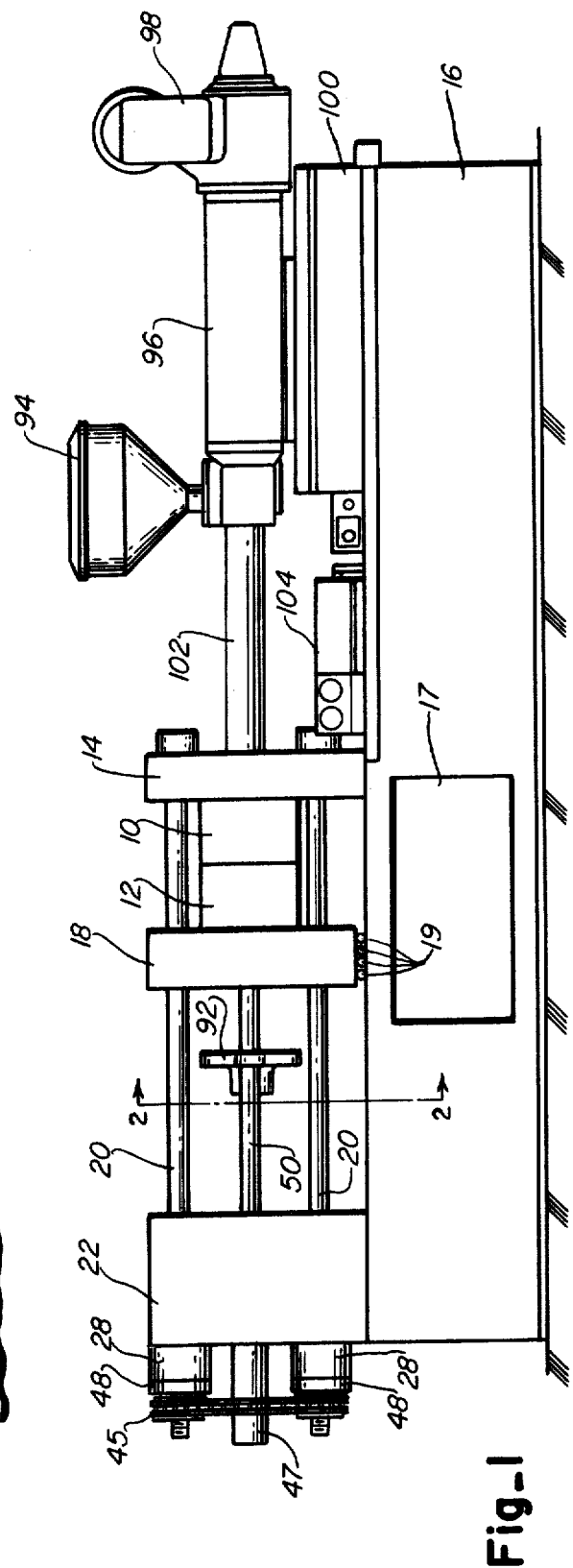

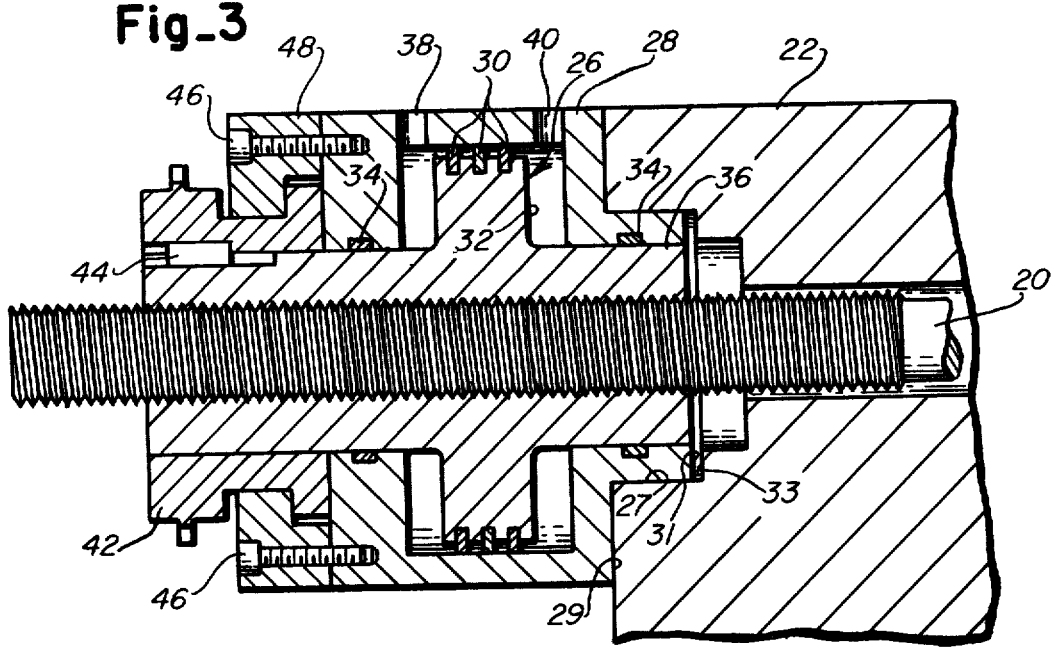
Fig_3
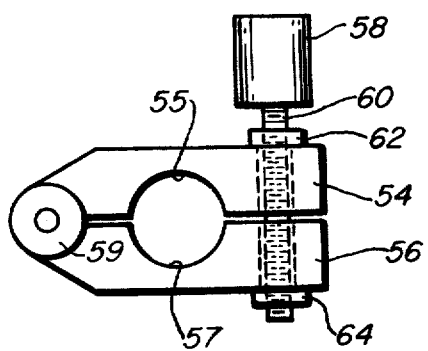
Fig_4
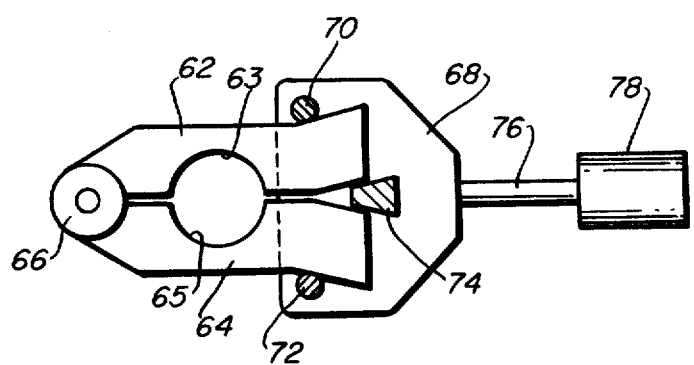
Fig_5
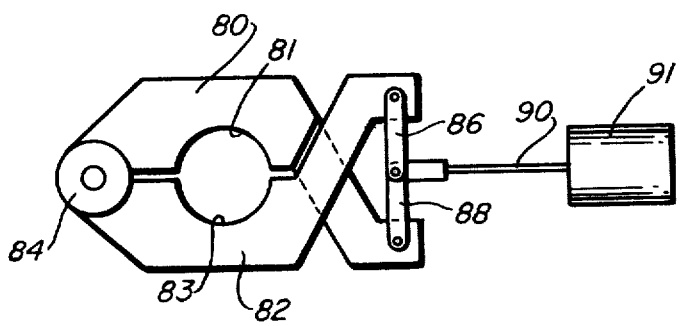
Fig_6

3,890,081

INJECTION HOLDING MACHINE CLAMP MECHANISM

This is a continuation of application Ser. No. 168,042, filed Aug. 2, 1971 now abandoned.

BACKGROUND OF THE INVENTION

This invention relates in general to new and useful improvements in a large injection molding machine and particularly to the clamp mechanism for forcing the mold portions together. It is desirable in such machines to have both a large stroke combined with rapid travel of one portion of the mold. It is desirable that the movement be made rapidly to minimize injection molding cycle time. It is necessary that the machine have a long stroke capability because of the length of some parts being molded. It is also desirable to minimize power consumption to provide maximum economy. To accomplish these purposes various mechanisms have been devised in the past. Some machines have used a single, very long, relatively large diameter cylinder to drive a platen both for ejection of the finished part and for changing the mold. Because the cylinder must provide the forces necessary for the final increment of closing motion, the cylinders must necessarily be massive and a large quantitiy of hydraulic fluid under high pressure is necessarily required.

Other prior art mechanisms have used a relatively small traversing cylinder to displace a movable platen in conjunction with a plurality of large area cylinders which engage the tie bars during each injection cycle to produce the final increment of displacement. The disadvantage of this structure is that it is necessary to clamp a large diameter cylinder on teeth of a tie bar during each cycle which causes wear problems.

SUMMARY OF THE INVENTION

In accordance with the invention, the plastic injection molding machine is adapted to receive two mold halves movable relative to each other for opening and closing the mold cavity formed therebetween. Carried on the base in fixed relationship is a stationary platen in upstanding relationship which carries the first section of the mold. A clamp housing carried on the base in upstanding relationship is movable toward and away from the stationary platen and a movable platen is also carried on the base in upstanding relationship between the stationary platen and the clamp housing. The movable platen is selectively movable toward and away from the stationary platen. The movable platen carries the second section of the mold for selective engagement with the first section of the mold. A plurality of elongated tie bars are carried by the upstanding members and each tie bar engages the stationary platen to prevent movement of the tie bar through the stationary platen. The tie bars slide through apertures in the movable platen and the clamp housing. A plurality of cylinder means carried in fixed relationship by the clamp housing engage each tie bar to control longitudinal movement of the tie bars with respect to the clamp housing. Means are also provided for traversing said movable platen with respect to the clamp housing along the upper surface of the base. Blocking means limit relative movement of the movable platen toward the clamp housing.

In the preferred embodiment the blocking means is removable and may be selectively positioned in blocking relationship.

Accordingly, the primary object of this invention is to provide a clamping mechanism which requires a minimum amount of energy to displace a mold holding member.

Another object is to provide a mechanism capable of positioning a mold holding member in a short time to reduce molding cycle time and which also is capable of a long stroke.

A still further object is to provide a mechanism which avoids repeated cyclical engagement with toothed tie bars and the associated wear problems.

BRIEF DESCRIPTION OF THE DRAWINGS

FIG. 1 is a front elevational view of a plastic injection molding machine embodying the present invention and showing the clamp mechanism in the closed position;

FIG. 2 is a sectional view taken along the line 2-2 of FIG. 1 showing the relationship of the tie bars, guide bars and ejector plate;

FIG. 3 is a detailed cross-sectional, broken-away view to an enlarged scale of the clamp housing, one of the four large area cylinder assemblies, a tie bar and a drive sprocket shown in FIG. 1;

FIG. 4 is a detailed view to an enlarged scale of one form of the interlock to prevent guide bar movement;

FIG. 5 is a detailed view to an enlarged scale of still another form of the mechanism to prevent guide bar movement;

FIG. 6 is a detailed view to an enlarged scale of still another form of the mechanism to prevent lock bar movement;

FIG. 7 is a broken-away, cross-sectional, detailed view to an enlarged scale of a simple form of the mechanism to prevent guide bar movement.

DESCRIPTION OF THE PREFERRED EMBODIMENT

Referring to FIGS. 1, 2 and 3, there is shown an injection molding machine having a stationary mold or die portion 10 and a movable mold or die portion 12 having engaging portions and at least one cavity therein for molding plastic material. The stationary die is carried by a stationary platen 14 which is fixed to a base 16. The movable mold portion 12 is carried by a movable platen 18 which is also carried by base 16 but has a plurality of rollers 19 therebetween to facilitate movement. The base 16 has a conventional large through aperture 17 which allows easy removal of molded parts such as by conveyor belt.

In the preferred embodiment, the four tie bars 20 have a generally elongated shape and one end thereof threaded. Each engages the movable platen 18 and passageway or apertures 21 in a clamp housing 22 carried by the base 16. The other end thereof is fixed to stationary platen 14.

The clamp housing 22 is of heavier construction than platens 14 and 18 and is positioned along the upper surface of base 16 to accommodate varying mold heights. The positioning of clamp housing 22 is accomplished by rotation of a piston 26 supporting each tie bar 20. Each piston 26 has an internally threaded surface cooperatively dimensioned and configured to engage the external surface of the threaded portion of the tie bar 20. The piston 26 is housed within a cylinder 28 which is rigidly attached to clamp housing 22. Preferably face 29 of cylinder 28 is fixed to clamp housing 22. Piston rings or seals 30 hydraulically isolate opposite faces of land 32 of the piston 26 and seals 34 prevent leakage past cylindical portion 28. The cylindical portion 28, when moving to the right as viewed, passes into a counterbore 27 in the clamp housing 22. Apertures 38 and 40 are provided for supplying hydraulic fluid to the faces of land 32. Rotation of piston 26 about its longitudinal axis is accomplished by driving sprocket 42 which is connected by a key 44 to the piston 26. A pin (not shown) prevents the key 44 from moving out of the key way when relative axial movement occurs between sprocket 42 and piston 26. The sprocket 42 is driven by an endless chain 45. An L shaped portion of sprocket 42 engages a lipped annular member 48 which is fixed to cylinder 28 by bolts 46 and which secures the sprocket 42 while allowing rotational movement. The annular member 48 may be split into arcuate sections depending on the relative size of the sprocket 42.

Clamp housing 22 carries a traversing cylinder 47 having a piston rod 49 extending therefrom slidingly engaging an aperture (not shown) in clamp housing 22. Piston rod 49 extends into a fixed engagement with movable platen 18. Suitable hydraulic hoses, valving and a pump (none shown) are provided to selectively apply pressure to each side of the piston in the traversing cylinder 47.

A pair of guide bars 50 and 52 extend freely into the clamp housing 22 and are connected to the movable platen 18. The guide bars also act as locking bars during part of the injection molding cycle. Referring to FIG. 7 blocking means are shown which may consist of a member 53 disposed in an aperture 61 in clamp housing 22 at right angles to a guide bar which member may be selectively positioned to block movement of guide bars 50 and 52 and thereby prevent movement of the movable platen 18 toward the clamp housing 22.

The blocking action may also be accomplished by any one of mechanisms illustrated on FIGS. 4, 5, or 6. In each embodiment the blocking action occurs simultaneously on each guide bar. The mechanism shown in FIG. 4 includes elongated members or bars 54 and 56 which are provided with arcuate channels through which a guide bar 50 or 52 may pass. A pivot member 59 joins members 54 and 56 for pivotal movement therebetween. Operation of fluid motor 58 rotates a screw 60 having axial spaced portions which respectively have right hand threads and left hand threads which respectively engage nuts 62 and 64 which are fixed to members 54 and 56. Rotation of screw 60 causes arcuate channels in members 54 and 56 to close or open and thereby grip or release one of the guide bars 50 or 52. Two pairs of members 54, 56 are required to provide for gripping guide bars 50, 52.

In the embodiment shown in FIG. 5 elongated members 62 and 64, joined by a pivot member 66, are provided with arcuate channels 63 and 65. A plate 68 carries pins 70 and 72 and a wedge 74. The plate 68 is carried by piston rod 76 which may be selectively reciprocated by a piston and cylinder assembly 78. Cooperating ramp surfaces on members 62 and 64 function in conjunction with pins 70 and 72 and wedge 74 to grip or release a guide bar 50 or 52.

In the embodiment shown in FIG. 6 offset members 80 and 82 having arcuate channels 81 and 83 are joined by a pivot member 84, with offset portions of members 80 and 82 are joined by toggle links 86 and 88. A piston rod 90 operated by a piston and cylinder assembly 91 may collapse and toggle and toggle links 86 from the position illustrated to open the arcuate channels 81 and 83 of members 80 and 82.

An ejector plate 92 is supported by the guide bars 50, 52 and piston rod 49 between the clamp housing 22 and the movable platen 18. Hydraulic cylinder means (not shown) is selectively operable to force the ejector plate 92 toward mold 12. Ejector rods (not shown) attached to the ejector plate 92 pass through the movable platen 18 and into the mold 12 to actuate ejector pins (not shown) when the mold portions 10 and 12 are separated upon completion of an injection molding cycle.

Also carried on the base 16 is a conventional injection mechanism including a feed hopper 94, a plasticator unit 96, drive mechanism 98, support base 100, as well as a barrel 102 and controls 104.

In operation sprockets 42 are driven by the chain 45 which causes piston 26 to rotate and thereby displace clamp housing 22. In one rotational direction of piston 26, the land 32 will bottom against one wall of cylinder 28. In the opposite direction of rotation the piston 26 will bottom against the opposite wall and further rotation will displace the entire clamp housing. Preferably the hydraulic piston 26 is displaced by hydraulic pressure applied at aperture 38 or 40 to initially bottom the land 32 before operating the chain drive 45. The displacement will most preferably be in the direction it is desired to move the clamp housing 22.

Pressure is initially applied to the right side of the piston in traversing cylinder 47 causing retraction of the movable platen 18 away from the stationary platen 14. The movement is suffient to allow placement of the mold portions 10 and 12 between the platens. The mold portions are latched together during this placement with the use of a conventional centering ring on the stationary platen which mates with a cooperatively dimensioned and configured surface on mold portion 10. The mold portions 10 and 12 are securely attached to their respective platens by use of latches and bolts (not shown). The latches retaining the mold portions 10 and 12 to each other are then removed and movable platen 18 is then moved to the left by traversing cylinder 47.

The mold height adjustment is made by initially backing the clamp housing 22 away from the moveable platen 18 by driving chain 45 and thereby sprockets 42 and pistons 26. Pressure is applied to the left hand side as viewed of the piston in cylinder 47 to provide maximum extension between movable platen 18 and clamp housing 22. Blocking means which may be any of the embodiments shown in FIGS. 4, 5, 6, or 7 are then engaged to prevent movement of movable platen 18 toward clamp housing 22. Pressure is applied to aperture 38 of each of the cylinders 28 to bottom the land 32 thereof against one wall of the cylinder 28. Thereupon, the chain 45 is driven to rotate sprockets 42 and each of the pistons 26 to position the mold portions 10 and 12 in a touching relationship. Ordinarily, the torque output of the hydraulic drive (not shown) for the chain 45 is relatively small and will therefore stall when the mold portions 10 and 12 touch. To allow for the final mold height adjustment, the blocking means is released, and the traversing cylinder is briefly supplied pressure at its right hand portion to slightly displace movable platen 18 toward clamp housing 22. The drive chain 45 is again operated to adjust the clamp housing a final increment toward the stationary platen 14. The increment of displacement equals the strain resulting from the stress which is the tonage capacity of the machine. This adjustment once made is not changed until a different mold is to be installed in the injection molding machine.

During a typical injection molding cycle, the clamp will be open and therefore the left hand side as viewed of the piston in traversing cylinder 47 is pressurized with the blocking means disengaged to displace movable platen 18 away from clamp housing 22. At the end of the traversing cylinder stroke, blocking means are positioned about guide bars 50 and 52 so that the movable platen may not move toward the clamp housing 22. Hydraulic pressure is then applied to each aperture 40 of each cylinder 28 to force both the clamp housing 22 and movable platen 18 slightly to the right as viewed to lock up the mold. The force produced by the cylinders 28 stretches each of the tie bars 20 an amount corresponding to the specified machine clamp capacity.

After injection of the plasticized compound through barrel 102 into the mold portions 10, 12 traversing cylinder 47 is operated to withdraw movable platen 18. The hydraulically actuated ejector plate 92 axially displaces ejector rods through movable platen 18 and into the mold 12 where ejector pins displace the molded part.

It should be understood that for the sake of convenience, the invention has been described in conjunction with an injection molding machine. This is not intended to limit the scope of the invention, it being apparent that the invention has application to other machines such as die casting machines which require substantial forces to close a mold and in which the massive nature of the structure makes the design of the mechanism critical to attain maximum speed and economy.

Furthermore, it should be apparent that the relative positions of the clamp housing, movable platen and stationary platen may be changed without affecting the operation of the instant invention. In one embodiment employing the invention, a stationary platen is disposed between a movable platen and a clamp housing. All are connected by tie bars and blocking means are selectively positioned between the clamp housing and the stationary platen. Exerting a tension force on the tie bars which slidingly engages the stationary platen places a mold positioned between the movable platen and the stationary platen in compression. Also, other mechanical apparatus such as electric motor with gears may be used to drive various parts of the apparatus instead of the hydraulic means in the preferred embodiment. It is also apparent that a three or more piece mold may also be used instead of the two-portion mold described herein. The guide bars which are conventional parts of injection molding machines are used in the preferred embodiment to perform the blocking action although separate bars or other blocking members may be used. The key connecting the sprocket with the large piston may be replaced with splines or other torque transmission device which allows axial displacement. Similarly, there may be more than two guide bars utilized depending on the capacity of the machine.

It may therefore be seen that the invention enables rapid positioning of a mold holding member having a long stroke and minimum energy requirements. Wear problems associated with the cyclical engagement with toothed tie bars are avoided.

I claim:

1. In a plastic injection molding machine carrying first and second sections of a mold having engaging portions the combination which comprises:
   a. A base;
   b. A stationary platen fixed on said base in upstanding relationship, said stationary platen carrying the first section of the mold;
   c. A clamp housing carried on said base in upstanding relationship and movable on said base toward and away from said stationary platen;
   d. A movable platen carried on said base in upstanding relationship and disposed between said stationary platen and said clamp housing, said movable platen being selectively movable toward and away from said clamp housing and said stationary platen and said movable platen carrying the second section of the mold for selective engagement with the first section of the mold;
   e. A plurality of elongated tie bars carried by said clamp housing, said stationary platen and said movable platen, said tie bars engaging said stationary platen to prevent movement of said tie bars through the stationary platen, said tie bars slidingly engaging said movable platen to allow relative longitudinal movement therebetween;
   f. A plurality of pistons and cylinders carried by said clamp housing with each of said cylinders in fixed relationship thereto, each piston having internal threads engaging corresponding threads on one of said tie bars so that rotating all of said pistons varies the mold height of the injection molding machine and application of hydraulic pressure to all of said pistons in one direction causes clamping of the mold;
   g. Means for traversing said movable platen with respect to said clamp housing along the upper surface of said base;
   h. Blocking means for limiting relative movement of said movable platen toward said clamp housing; and
   i. Drive means for simultaneously rotating each of said pistons equal angular increments to vary the mold height of the injection molding machine.

2. The apparatus as described in claim 1 wherein said blocking means comprises a pair of rigid members selectively positionable in interfering relationship between said clamp housing and said movable platen.

3. The apparatus as described in claim 1 wherein said blocking means is selectively positionable in blocking relationship.

4. The apparatus as described in claim 3 wherein said means for traversing said movable platen includes a double acting piston and cylinder assembly.

5. The apparatus as described in claim 4 wherein each of said cylinder means is a double acting cylinder.

6. The apparatus as described in claim 5 wherein said blocking means includes guide bars fixed to said movable platen and slidingly engaging said clamp housing.

7. The apparatus as described in claim 6 wherein said blocking means includes two blocking members in pivotal relationship having arcuate channels dimensioned and configured for selective engagement with the circumference of said guide bars and including means for pivoting said blocking members.

8. The apparatus as described in claim 7 wherein said means for pivoting said blocking members includes screw threads of opposite direction in each of said blocking members and a cooperatively configured screw.

9. The apparatus as described in claim 7 wherein said means for pivoting said blocking members includes offset extensions of said blocking members and a toggle linkage connecting said offset portions.

10. In a plastic injection molding machine carrying first and second sections of a mold having engaging portions, the combination which comprises:
   a. A base;
   b. A stationary platen fixed on said base in upstanding relationship, said stationary platen carrying the first section of the mold;
   c. A clamp housing carried on said base in upstanding relationship and movable on said base toward and away from said stationary platen;
   d. A movable platen carried on said base in upstanding relationship and disposed between said stationary platen and said clamp housing, said movable platen being selectively movable toward and away from said clamp housing and said stationary platen and said movable platen carrying the second section of the mold for selective engagement with the first section of the mold;
   e. A plurality of elongated tie bars carried by said clamp housing, said stationary platen and said movable platen, said tie bars engaging said stationary platen to prevent movement of said tie bars through the stationary platen, said tie bars slidingly engaging said movable platen to allow relative longitudinal movement therebetween;
   f. A plurality of pistons and cylinders carried by said clamp housing with each of said cylinders in fixed relationship thereto, each piston having internal threads engaging corresponding threads on one of said tie bars, said threads extending along the axial length of said piston, said piston having an upstanding land portion intermediate said axial length, said land portion having a sealing surface on the circumference thereof; and
   g. Means for traversing said movable platen with respect to said clamp housing along the upper surface of said base.

11. The apparatus as described in claim 10 further including blocking means for limiting relative movement of said movable platen towards said clamp housing.

12. The apparatus as described in claim 11 wherein said blocking means comprises a pair of rigid members selectively positionable in interfering relationship between said clamp housing and said movable platen.

13. The apparatus as described in claim 11 wherein said blocking means is selectively positionable in blocking relationship.

14. The apparatus as described in claim 10 wherein each of said cylinder means is a double acting cylinder.

15. The apparatus as described in claim 11 wherein said blocking means includes guide bars fixed to said movable platen and slidingly engaging said clamp housing.

16. The apparatus as described in claim 15 wherein said blocking means includes two blocking members in pivotal relationship having arcuate channels dimensioned and configured for selective engagement with the circumference of said guide bars and including means for pivoting said blocking members.

17. The apparatus as described in claim 16 wherein said means for pivoting said blocking members includes screw threads of opposite direction in each of said blocking members and a cooperatively configured screw.

18. The apparatus as described in claim 16 wherein said means for pivoting said blocking members includes offset extensions of said blocking members and a toggle linkage connecting said offset portions.

19. The apparatus as described in claim 16 wherein means for pivoting said blocking members includes wedging means for forcing said blocking members open and closed.

20. The apparatus as described in claim 7 wherein means for pivoting said blocking members includes wedging means for forcing said blocking members open and closed.

* * * * *

UNITED STATES PATENT OFFICE
CERTIFICATE OF CORRECTION

PATENT NO. : 3,890,081
DATED : June 17, 1975
INVENTOR(S) : Volker R. Grundmann

It is certified that error appears in the above-identified patent and that said Letters Patent are hereby corrected as shown below:

In The Title:

Change "HOLDING" to --MOLDING--.

In The Specification:

Column 1, line 24, change "quantitiy" to --quantity--.

Column 3, line 67, after "collapse" change "and" (first occurrence) to --the--.

Signed and Sealed this second Day of September 1975

[SEAL]

Attest:

RUTH C. MASON
Attesting Officer

C. MARSHALL DANN
Commissioner of Patents and Trademarks